United States Patent
Misra et al.

(10) Patent No.: US 8,159,497 B2
(45) Date of Patent: Apr. 17, 2012

(54) SHARING A DATA BUFFER

(75) Inventors: Ronnie G. Misra, Sunnyvale, CA (US); Joshua H. Shaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1049 days.

(21) Appl. No.: 12/041,397

(22) Filed: Mar. 3, 2008

(65) Prior Publication Data

US 2008/0155232 A1    Jun. 26, 2008

Related U.S. Application Data

(63) Continuation of application No. 11/328,495, filed on Jan. 6, 2006, now Pat. No. 7,346,762.

(51) Int. Cl.
- *G06F 15/167* (2006.01)
- *G09G 5/36* (2006.01)
- *G09G 5/397* (2006.01)

(52) U.S. Cl. .................. 345/541; 345/545; 345/546

(58) Field of Classification Search .......... 345/541, 345/545, 546; 711/147; 712/207, 226; 717/153
See application file for complete search history.

(56) References Cited

U.S. PATENT DOCUMENTS

| | | | | |
|---|---|---|---|---|
| 5,754,242 | A * | 5/1998 | Ohkami | 348/441 |
| 2005/0246502 | A1 * | 11/2005 | Joshi et al. | 711/147 |
| 2006/0106988 | A1 | 5/2006 | Khawand et al. | |

\* cited by examiner

*Primary Examiner* — Hau Nguyen
(74) *Attorney, Agent, or Firm* — Fish & Richardson P.C.

(57) ABSTRACT

A computer-program product may have instructions that, when executed, cause a processor to perform operations including managing execution of application functions that access data in a shared buffer; determining if a first instruction that is stored at a first memory location causes, upon execution, data to be read from or written to the shared buffer; and when it is determined that the first instruction causes data to be read from or written to the shared buffer, 1) identify one or more replacement instructions to execute in place of the first instruction; 2) store the one or more replacement instructions; and 3) replace the first instruction at the first memory location with a second instruction that, when executed, causes the stored one or more replacement instructions to be executed.

21 Claims, 11 Drawing Sheets

SHARING A DATA BUFFER

CROSS-REFERENCE TO RELATED APPLICATIONS

This application is a continuation application of and claims priority to U.S. application Ser. No. 11/328,495, filed on Jan. 6, 2006, which is herein incorporated by reference in its entirety.

TECHNICAL FIELD

This document generally relates to computing systems.

BACKGROUND

A computing device may execute various applications to interact with users of the computing device and to manipulate various data, which may be provided or specified by the user. At a low level, applications are made up of instructions that are executed by a processor in the computing device. When executed, each instruction causes the processor to perform a discrete function. Many such functions involve manipulation of data that is stored in some form of memory, such as a storage device (e.g., a hard disk drive or optical storage device), random access memory (RAM) of some form, cache memory, or registers within or associated with the processor. Areas of memory may be allocated for use for a particular function or by a particular application, and such areas of memory may be referred to as a "buffer." A buffer that is used by multiple applications or for more than one function may be referred to as a "shared buffer."

One example of a shared buffer is a frame buffer that is used by a computing device to display graphical information on a corresponding display screen. Each pixel in the display screen may correspond to a portion of the frame buffer. For example, a frame buffer may reserve four bytes of data for each pixel in the display screen. The address of each four-byte block in the frame buffer may correspond to a physical location of a specific pixel in the display screen. To display information on the display screen, the computing device may first fill the frame buffer with values that specify, for example, color and intensity values for each pixel. Subsequently, a graphics controller may control the pixels in the display screen according to the values in the frame buffer. To "refresh" the display screen, the computing device may fill the frame buffer with new values.

The frame buffer may be "shared" in the sense that more than one application may read values from or write values to the frame buffer, in order to display information on the display screen. For example, a computing device that runs an operating system, such as a version of Mac OS, available from Apple Computer, Inc., may display "windows" corresponding to a number of different applications. Applications corresponding to each window may control a portion of the frame buffer that corresponds to the position of the display screen that is occupied by the window. As an application updates information that is to be displayed in a corresponding window, or as the window is resized or moved by a user, a corresponding portion of the frame buffer may be updated. If multiple applications are running, multiple portions of the frame buffer may be updated simultaneously or substantially close in time.

The format of data in a shared buffer may be different than the format of data natively processed by the various applications. For example, in the context of the frame buffer described above, a graphics card associated with the display screen may be designed to receive data from the frame buffer in four-byte words for each pixel in the display screen. However, an application that has an active window on the display screen, and that writes to the frame buffer, may only supply one byte of data for each pixel. As another example, two applications that store data in a shared buffer may each process the data in a different order. More particularly, a first application may process data in four-byte words having a little endian format while a second application may process data in a big endian format.

SUMMARY

This document generally relates to systems, apparatus, methods and computer program implementations for interacting with a shared buffer. To facilitate sharing, data may be required to be modified before it is written to the shared buffer or after it is read from the shared buffer, in order to convert the data from a first format to a second format. Referring to the first example above, the systems and techniques described herein may be used to convert display screen data between a one-byte-per-pixel format and a four-bytes-per-pixel format after it is read from the frame buffer that corresponds to the display screen or before it is written to the frame buffer. Referring to the second example above, the systems and techniques described herein may also be used to convert data between a little endian format and a big endian format before the data is written to the shared buffer or after the data is read from the shared buffer. According to the systems and techniques described herein, this conversion process may be performed efficiently, (e.g., without substantially decreasing performance of corresponding applications) and without modification to the program that accessed the shared buffer.

Advantages of the systems and techniques described herein may include any or all of the following. Various applications, including legacy applications, may be integrated in a single computing system. Performance may be substantially maintained in a system that integrates two or more applications that natively process data in different formats and share a common buffer. A technique for converting data from a first format to a second format may be extended to data having other formats.

The general and specific aspects may be implemented using a system, a method, or a computer program, or any combination of systems, methods, and computer programs. The details of one or more implementations are set forth in the accompanying drawings and the description below.

DESCRIPTION OF DRAWINGS

These and other aspects will now be described in detail with reference to the following drawings.

Like reference symbols in the various drawings indicate like elements.

DETAILED DESCRIPTION

This document generally relates to systems, apparatus, methods and computer program implementations for interacting with a shared buffer. To facilitate sharing, data may be required to be modified before it is written to the shared buffer or after it is read from the shared buffer, in order to convert the data from a first format to a second format. Referring to the first example above, the systems and techniques described herein may be used to convert display screen data between a one-byte-per-pixel format and a four-bytes-per-pixel format after it is read from the frame buffer that corresponds to the display screen or before it is written to the frame buffer. Referring to the second example above, the systems and techniques described herein may also be used to convert data between a little endian format and a big endian format before the data is written to the shared buffer or after the data is read from the shared buffer. According to the systems and techniques described herein, this conversion process may be performed efficiently, (e.g., without substantially decreasing performance of corresponding applications) and without modification to the program that accessed the shared buffer.

Figure 1:
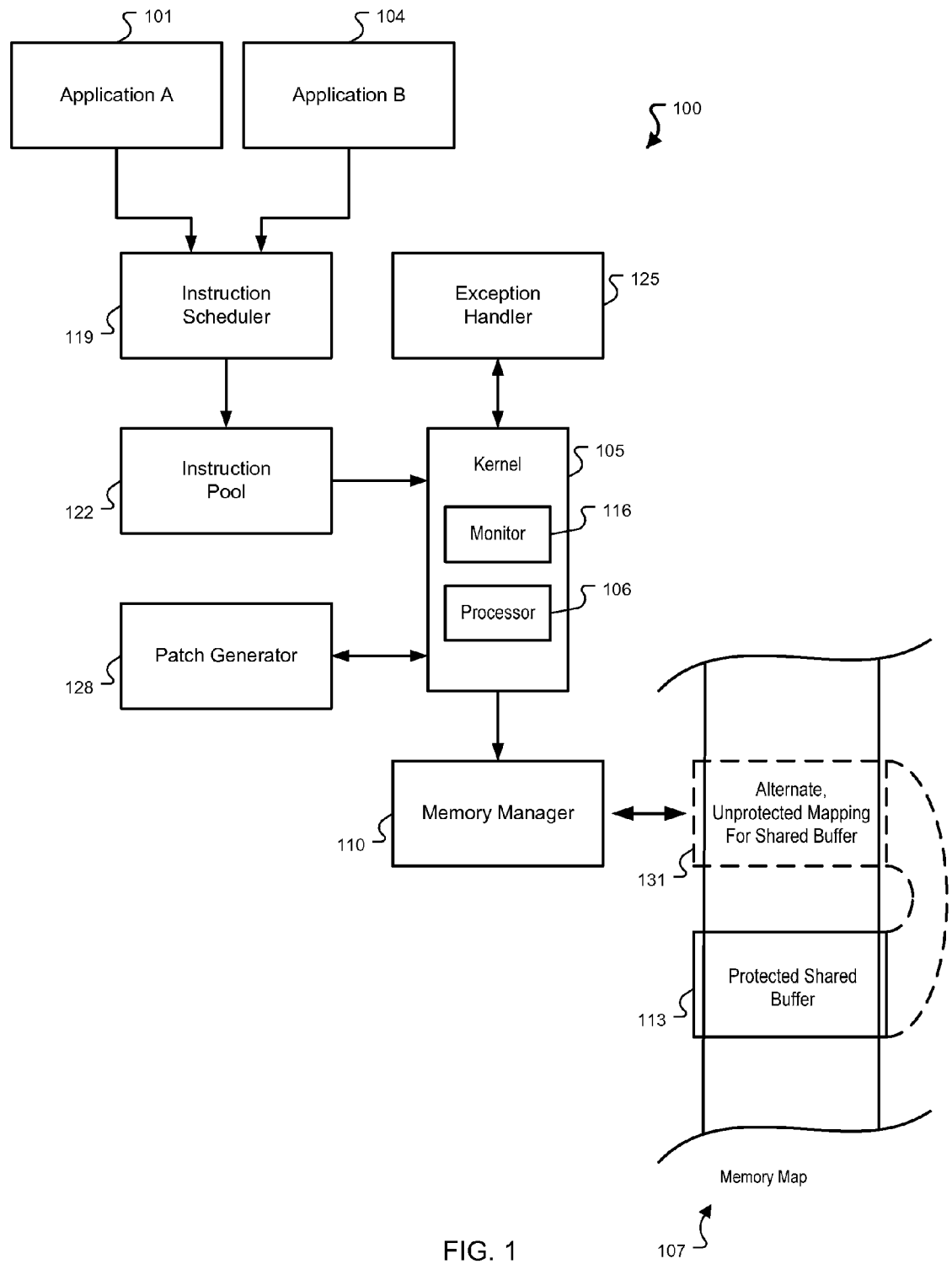
FIG. 1 is a block diagram that generally illustrates components of a computing device that may be used with a shared buffer.

FIG. 1 is a block diagram that generally illustrates components of a computing device 100 that may be used to share a buffer and transform data associated with the shared buffer from a first format to a second format, as required. The computing device executes instructions corresponding to two or more application programs, functions, routines, subroutines, calls or threads ("applications"). The instructions may cause the computing device 100 to receive input from various input devices, generate output in various output devices and manipulate data stored in various memory devices. In some implementations, two or more applications may share a common portion of memory, or "buffer," to store data. In some implementations, each of the applications may process the data in a different format, or in a format that is different than the format of data in the shared buffer. The data may require transformation or other special processing prior to being stored in the shared buffer or after being retrieved from the shared buffer.

As shown, the computing device 100 runs at least two applications—Application A 101 and Application B 104. Each of the applications 101 and 104 includes instructions (not shown in FIG. 1) that, in some implementations, are executed by a kernel 105. More particularly, a processor portion 106 of the kernel 105 may execute the instructions.

Instructions may access data that is stored in various memory devices that are "mapped" at various points in a memory map 107. The memory map 107 represents a range of addressable memory space. When executing instructions that access memory devices in the memory map 107, the processor 105 may employ a memory manager 110, which may be responsible for interacting with the physical memory devices themselves. Within the memory map 107, a region of memory may be allocated as a shared buffer 113 for use by two or more applications. As mentioned above, the data may be stored in the shared buffer 113 in a different format than is required for processing by one or both of the applications 101 or 104; thus, the data may require transformation from a first format to a second format after it is read from the shared buffer or before it is written to the shared buffer. In some implementations, to prevent data from being corrupted as it is read from or written to the shared buffer, the shared buffer may itself be "protected."

As shown, the shared buffer 113 is protected. In some implementations, the kernel 105 or memory manager 110 provides the protection for the buffer 113. For example, the kernel 105 may protect the buffer 113 by generating an exception any time the kernel 105 receives an instruction that accesses data in the shared buffer 113. In some implementations, a monitor 116 within the kernel 105 may generate such an exception. In some implementations, the memory manager 110 may generate an exception any time the kernel 105 causes it to access the buffer 113.

Instructions from the applications 101 and 104 reach the kernel 105 via an instruction scheduler 119 and an instruction pool 122. In some implementations, the instruction scheduler 119 and instruction pool 122 may prefetch instructions from a memory device and reorder them in an order that optimizes their execution by various execution units (not shown) within the processor 106. In some implementations, the instruction pool 122 may be a memory device, such as an internal instruction cache or an instruction queue, that stores instructions once they have been scheduled.

As shown, the computing device 100 includes an exception handler 125 that may handle any exceptions generated by the kernel 105, the memory manager 110, or other devices within the computing device 100. The exception handler may provide dedicated resources to the kernel 105 for handling exceptions, such as a separate program counter, dedicated registers, a dedicated stack, or memory for exception handler instructions. When an exception occurs, the exception handler 125 may take over operation of the computing device 100, or the kernel 105 may employ the resources of the exception handler 125 in order to execute exception handler instructions. After handling the exception handler instructions, the kernel 105 may resume normal operation and control of the computing device 100.

As shown, the computing device 100 also includes a patch generator 128. The patch generator 128 may provide necessary transformation of data that is stored in the shared buffer 113. For example, if the application 101 and the shared buffer 113 process and store data in a first format, and the application 104 processes data in a second format, the patch generator 128 may transform read data from the first format to the second format before the data is provided from the shared buffer to the application 104. Similarly, the patch generator 128 may transform write data from the application 104 from the second format to the first format before writing the data to the shared buffer 113. Several examples are now provided of how the patch generator 128 may transform data.

One example of how the patch generator 128 may transform data after it is read from the shared buffer 113, or before it is written to the shared buffer 113, is by physically manipulating the data within the memory manager 110. For example, as will be further described with reference to FIG. 2A, a first format may be four-byte data in little endian format, and a second format may be four-byte data in big endian format; transforming the data may involve rearranging bytes within a word. In some implementations, such a function may be provided by the memory manager 110, under control of the patch generator 128. For example, the patch generator 128 may monitor instructions being executed in the kernel 105, or instructions in the instruction pool 122, and may cause the memory manager 110 to directly transform data associated with these instructions as appropriate.

Another example of how the patch generator 128 may transform data is by dynamically replacing instructions that process the data. For example, the patch generator may identify an instruction associated with a first application 101 and a first data format; the instruction may read data that is stored in a second format from the shared buffer 113; and the patch generator 128 may replace the read instruction with another read instruction and one or more instructions that transform the data in an appropriate manner. In some implementations, the patch generator 128 may dynamically filter a stream of instructions as the instructions are provided to the kernel 105. In some implementations, the patch generator 128 may replace multiple instructions within the instruction pool 122, before they are pulled to the kernel 105 for execution.

Another example of how the patch generator 128 may transform data is through the use of one or more exception routines in the exception handler 125. Each time an instruction that accesses the shared buffer 113 is executed, an exception may be generated. The exception handler 125 may provide an exception routine that transforms data as appropriate. In some implementations, data may be transformed by instructions that access an alternate, unprotected mapping of the shared buffer 113. For example, in the memory map 107, the shared buffer 113 may be "mirrored" to an alternate mapping 131 of the shared buffer 113. In some implementations, this alternate mapping 131 is not protected; thus accesses to the buffer 131 may not generate exceptions. The exception handler 125 or the patch generator 128 may access data from the alternate, unprotected buffer 131, while the applications may access data from the protected buffer 113. In this manner, accesses to the protected buffer 113 may be controlled by the patch generator 128.

As shown, the patch generator 128 and the kernel monitor 116 are distinct elements, but in some implementations, the two elements 116 and 128 may be integrated or more tightly coupled than they are shown in FIG. 1. For example, in some implementations, the patch generator 128 itself may be implemented as microcode in the kernel 105. In some implementations, the monitor 116 may be part of the patch generator 128, external to the kernel 105.

The patch generator 128 may also be configured differently than it is shown in FIG. 1. For example, in some implementations, the patch generator 128 may be interposed between the instruction pool 122 and the kernel 105. In some implementations, at least portions of the patch generator 128 may be included within the kernel 105. Moreover the patch generator 128 may be coupled to other components in FIG. 1 in ways other than those shown. For example, the patch generator 128 may be coupled to the instruction pool 122, the memory manager 110 or the exception handler 125.

Figure 2A:
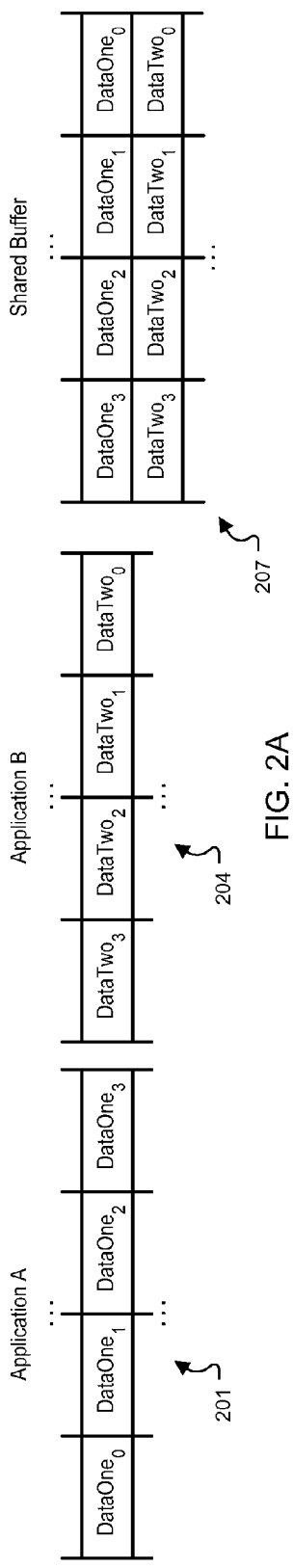
FIGS. 2A, 2B and 2C provide examples of various formats of data that may be processed by a first application or a second application or stored in a shared buffer for use by the first and second applications.
Figure 2B:
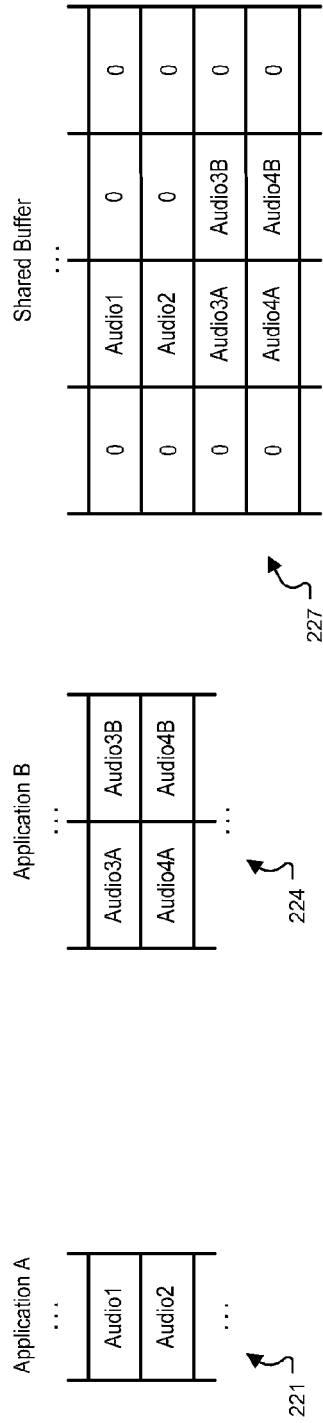
Figure 2C:
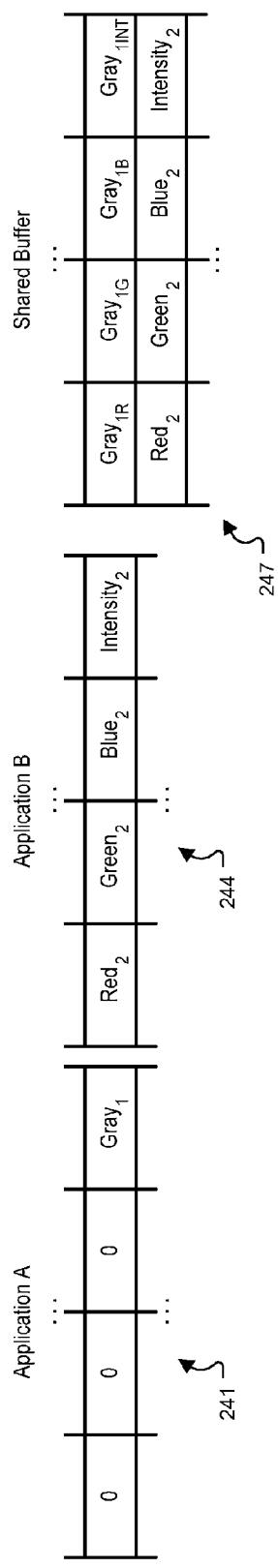

FIGS. 2A, 2B and 2C provide examples of various formats of data that may be processed by a first application or a second application or stored in a shared buffer for use by the first and second applications. FIG. 2A illustrates two different arrangements of bytes within a four-byte word. As shown, Application A processes data in little endian format. That is, the first addressable byte (leftmost) in a word 201 of data processed by Application A is the lowest-order byte ("Data-One$_0$"). In contrast, Application B processes data in big endian format. That is, the first byte in a word 204 of data processed by Application B is the highest-order byte ("Data-One$_3$"). As illustrated by example words 207, the shared buffer stores data in a big endian format.

To process the data illustrated in FIG. 2A, a computing device executing instructions from Application B may directly read data from or write data to the shared buffer. However, when executing instructions from Application A that access the shared buffer, the computing device must first reorder the bytes within a word of data. That is, in order to deliver read data from the shared buffer to application A, the bytes of the read data must be first reordered. Similarly, in order to write data from Application A to the shared buffer, the bytes of the write data must first be reordered.

FIG. 2B illustrates data having three different formats, depending on whether it is processed by Application A or by Application B, or stored in the shared buffer. As shown, Application A processes single-byte data 221, such as 8-bit audio data; Application B processes two-byte data 224, such as 16-bit audio data; and the shared buffer stores four-byte data 227 such as zero-padded 24-bit audio data.

To process data illustrated in FIG. 2B, a computing device executing instructions that access the shared buffer from either Application A or Application B must transform the data. That is, in order for Application A to process data stored in the shared buffer, the 24-bit data 227 must first be transformed or converted to an 8-bit format 221. In order for Application B to process data stored in the shared buffer, the 24-bit data 227 must first be transformed or converted to a 16-bit format 224. For simplicity, the data 227 as shown as data 221 or 224 is zero-padded to fit in the shared buffer, but more complicated transformations may be required, depending on the precise format of the 8-bit, 16-bit and 24-bit data. For example, the data 227 may be encoded in a particular manner as 24-bit data; in order to compress the data in 8-bit format, the data may require re-encoding.

FIG. 2C illustrates data having two other formats. As shown, data 244, which is processed by Application B, and data 247, which is stored in the shared buffer, is 32-bit graphical data. As shown, the 32-bit graphical data has eight bits for each of red, green and blue components and eight bits for an intensity level (or alternatively, 8 bits of alpha channel data are provided). Data 241, which is processed by Application A, is shown as 8-bit gray scale data that is zero-padded to be stored one value per four-byte word.

To process the data illustrated in FIG. 2C, a computing device executing instructions from Application A that access the shared buffer must transform the data. When a computing device executes instructions from Application B, it may directly read data from and write data to the shared buffer. As shown, transforming data from Application A before storing it in the shared buffer may include mapping the 8-bit gray scale to a 32-bit value with red, green, blue and intensity components. Conversely, transforming data from the shared buffer for use by Application A may include mapping a 32-bit word with red, green, blue and intensity components to an 8-bit gray scale value.

Figure 3:
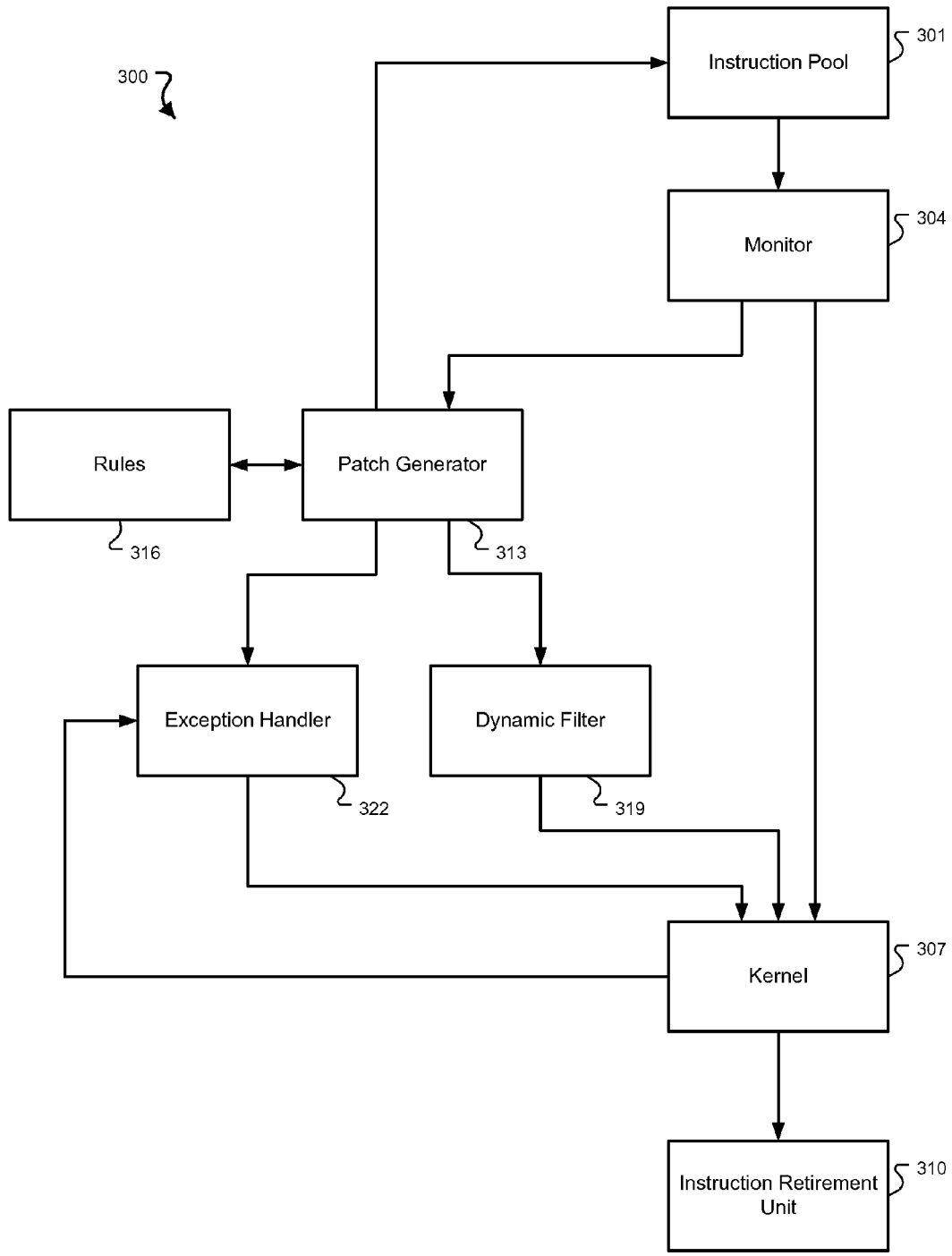
FIG. 3 is a block diagram that illustrates additional details of a computing system that may be used to transform data from a first format to a second format.

FIG. 3 is a block diagram that illustrates additional details of a computing system that may be used to transform data from a first format to a second format. In particular, the components illustrated in FIG. 3 may be used, for example, to transform data as it is read from a shared buffer in a first format and provided to an application that processes data in a second format.

As shown, the computing system 300 includes an instruction pool 301, a monitor 304, a kernel 307 and an instruction retirement unit 310. Instructions in the instruction pool 301 may be executed by the kernel 307, and when they have been completely executed, they may be retired by the instruction retirement unit 310. Certain instructions, such as instructions that access a portion of memory that is shared by different application programs or by different instructions threads may require special handling. Such instructions may be identified by the monitor 304 and may be processed by a patch generator 313, rather than directly routed to the kernel 307. The patch generator 313 may access data transformation rules 316 and context associated with an instruction to determine how to process the instruction. For example, referring back to FIG. 2A, context associated with a read of a protected shared buffer may indicate that the instruction is from Application A. The rules may direct the patch generator 313 to read a data word specified by the instruction from the buffer (in big endian format), then to swap bytes within the word to transform the data to a little endian format before providing the data to Application A. Context associated with another read of the protected shared buffer may indicate that the instruction is from Application B. The rules may direct the patch generator 313 to read the data word specified by the instruction without performing any additional processing, since Application B processes data in big endian format—the same format as the data in the shared buffer.

The rules 316 may include two transformation rules for each application that accesses a shared buffer. For example, referring to FIG. 2B, The rules 316 may include a rule for reads of shared buffer data by Application A ("convert 24-bit audio data to 8-bit audio data"); a rule for writes by Application A to the shared buffer ("convert 8-bit audio data to 24-bit audio data"); a rule for reads of shared buffer data by Application B ("convert 24-bit audio data to 16-bit audio data"); and a rule for writes to the shared buffer by Application B ("convert 16-bit audio data to 24-bit audio data").

After accessing an appropriate rule for a particular instruction, the patch generator may generate a "patch" that appropriately transforms the data. The patch may take many different forms, as is briefly described with reference to FIG. 1. For example, the patch may dynamically transform the actual data. As another example, the patch may dynamically filter and replace instructions; more particularly, in the case of the rule "convert 24-bit audio data to 16-bit audio data" associated with a read instruction, the patch generator may dynamically replace the read instruction with a read followed by a series of instructions that perform the required transformation of the data. As another example, the patch may "replace" an instruction with other instructions in an exception handler or elsewhere.

In some implementations, the patch generator 313 may dynamically act on a single instruction or on data as it passes through a portion of a computing device. For example, the patch generator 313 may replace a single read instruction with a series of instructions that read and transform data appropriately, or the patch may be implemented by an exception handler that is invoked by a single instruction. In some implementations, the patch generator 313 may preemptively act on instructions before they pass through the computing device for execution. For example, after identifying a rule associated with a specific instruction that reads from or writes to a shared buffer from a particular application and generating a series of instructions with which to replace the specific instruction, the patch generator 313 may dynamically replace the specific instruction and preemptively replace other instances of the specific instruction. For example, the patch generator 313 may preemptively replace other instances of the instruction in the instruction pool 301.

In some implementations, the patch generator may configure a filter to be used on subsequent instructions. For example, the dynamic filter 319 may be configurable. The first time the patch generator 313 generates a series of instructions with which to replace a specific instruction, the patch generator 313 may configure the configurable dynamic filter 319 to automatically replace subsequent instances of the specific instruction with the generated series of instructions.

In some implementations, the patch generator may dynamically generate code for use by an exception handler 322 or otherwise. For example, the first time the patch generator 313 generates a series of instructions with which to replace a single instruction, the patch generator 313 may configure an exception handling routine to execute the generated series of instructions each time subsequent similar instructions are executed (which may cause, for example, subsequent exceptions). As another example, the dynamically generated code may be generated as a routine or procedure to be processed outside of an exception handler. After generating the code, the patch generator 313 may replace corresponding instructions with a call to the routine.

Figure 4A:
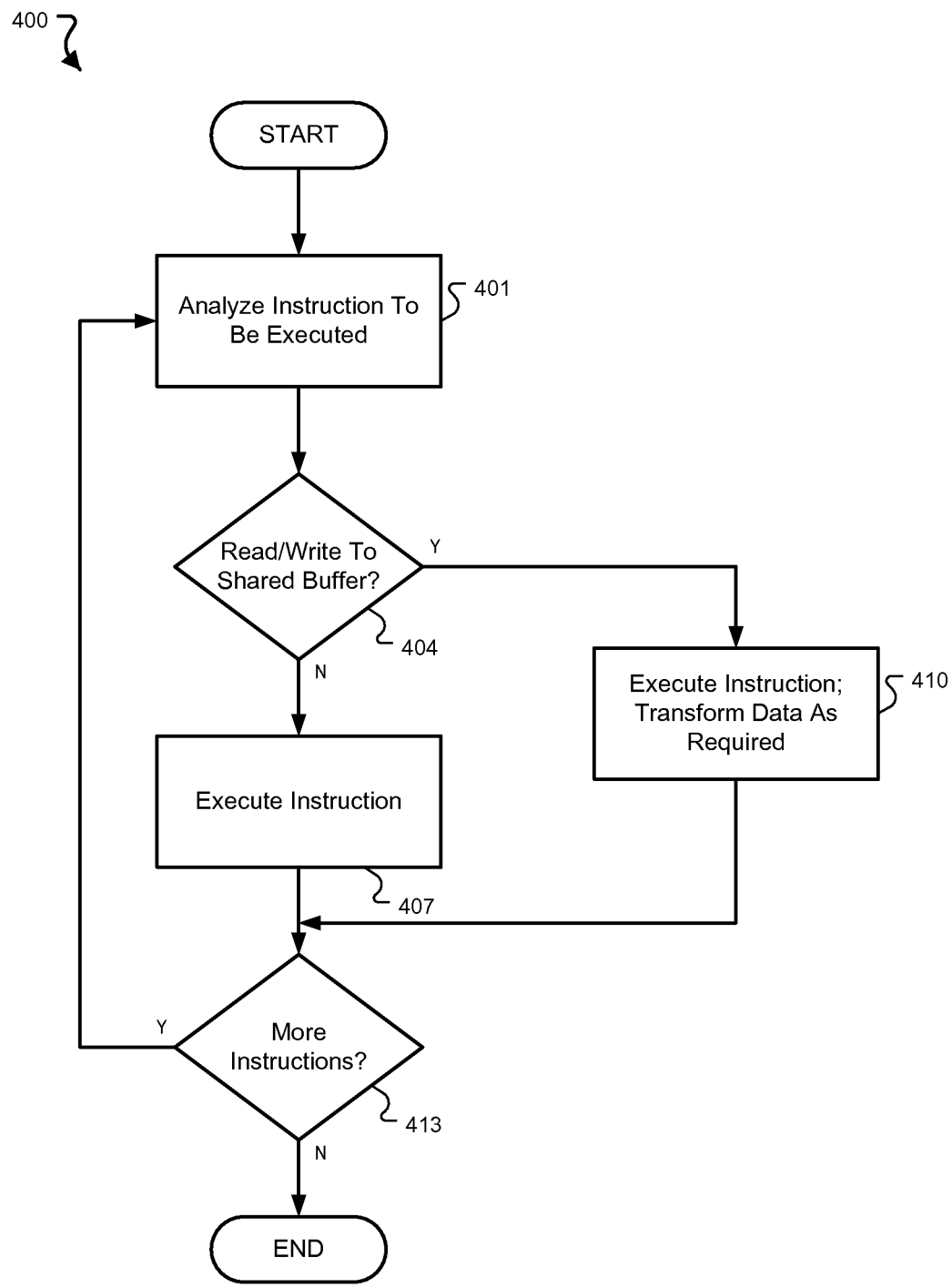
FIG. 4A illustrates a method of transforming data associated with a shared buffer from a first format to a second format.

FIG. 4A illustrates a method of transforming data associated with a shared buffer from a first format to a second format. The method 400 may be implemented, for example, by a monitor that monitors a stream of instructions to be executed by a processor. For example, referring to FIG. 1, the method 400 may be performed by the monitor 116 in conjunction with the patch generator 128. As another example, referring to FIG. 3, the method 400 may be performed by the monitor 304 in conjunction with the patch generator 313 and the rules 316.

The method 400 analyzes (401) instructions to be executed. For example, referring to FIG. 3, the monitor 304 may analyze (401) instructions as they flow from the instruction pool 301 to the kernel 307. The method 400 determines (404) whether an instruction is a read or write associated with a shared buffer. For example, referring to FIG. 1, the method may determine (404) whether an instruction is a read or a write to the shared buffer 113.

If the instruction is not a read or write associated with a shared buffer, the instruction may be executed (407). For example, referring to FIG. 3, if the monitor 304 determines (404) that an instruction is not a read or write associated with a shared buffer, the monitor 304 may pass the instruction on to the kernel 307 for execution.

If the instruction is a read or write associated with a shared buffer, the instruction may be specially handled; that is, the instruction may be executed (410) and data accessed by the instruction may be transformed (410), as appropriate. For example, referring to FIG. 3, if the monitor 304 determines (404) that an instruction is a read or write associated with a shared buffer, the monitor 304 may pass the instruction to the patch generator 313 rather than to the kernel 307. The patch generator 313 may execute (410) the instruction and transform corresponding data as appropriate, in conjunction with rules 316, and possibly in conjunction with a dynamic filter 319 or the exception handler 322. Transforming data with the dynamic filter 319 or with the exception handler 322 are described in greater detail with reference to FIGS. 4C and 4D, respectively.

After an instruction is executed (407 or 410), the method 400 determines (413) whether there are other instructions to process. If so, the other instructions are analyzed (401); if not, the method 400 terminates.

Figure 4B:
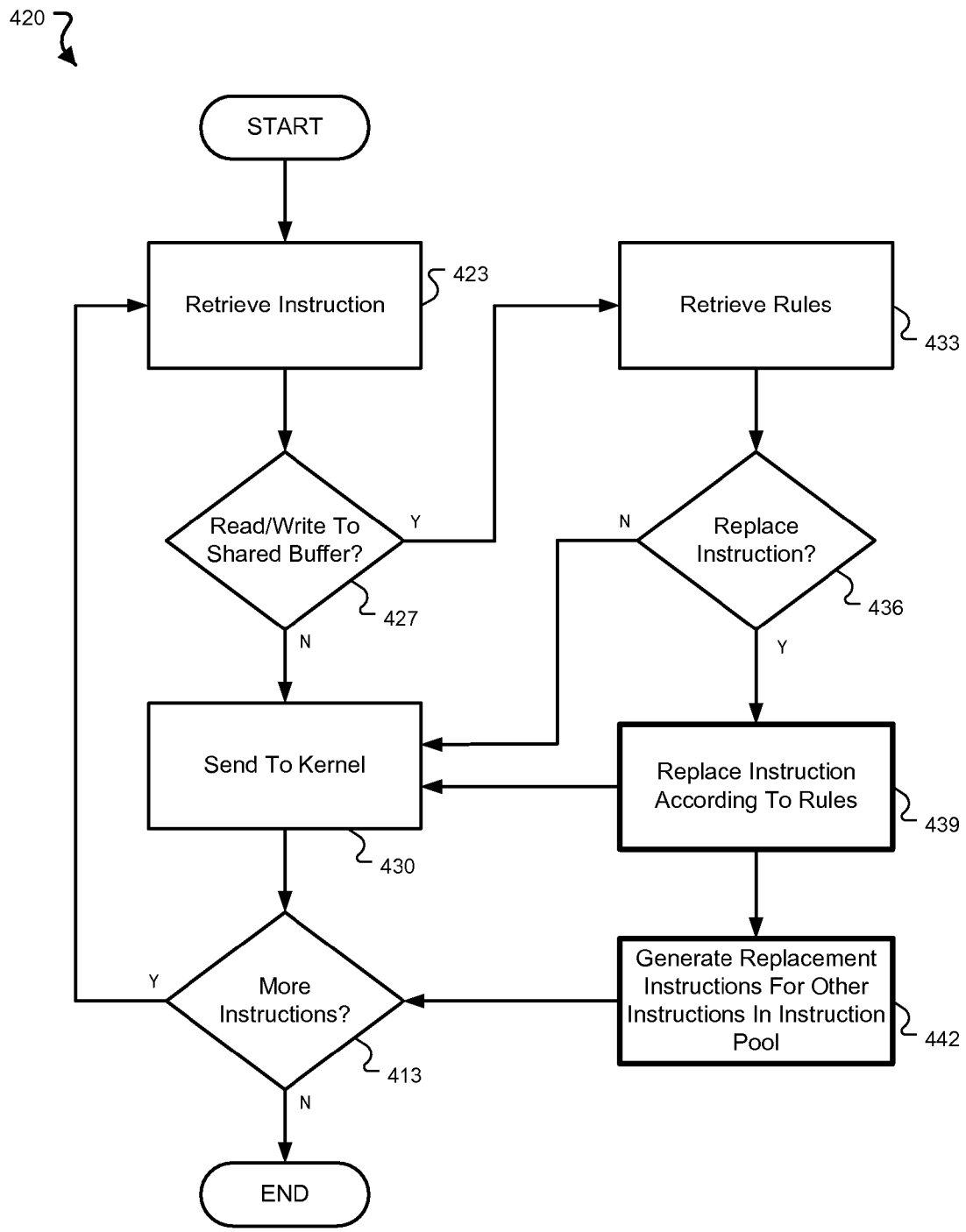
FIGS. 4B, 4C and 4D illustrate additional examples of methods for sharing a buffer.

FIG. 4B illustrates one example method (420) of the general method 400 depicted in FIG. 4A. In particular, the example method 420 illustrates how instructions may be replaced within an instruction pool, in order for data accessed by the instructions to be transformed from a first format to a second format.

The method 420 retrieves (423) an instruction and determines (427) whether the instruction is a read or write associated with a shared buffer. If the instruction is not a read or write associated with a shared buffer, the instruction may be sent (430) to a kernel for processing. For example, referring to FIG. 3, an instruction may be retrieved (423) from the instruction pool 301, analyzed (427) by the monitor 304 to determine if the instruction is a read or write associated with a shared buffer, and sent (430) to the kernel 307 for processing if the instruction is not a read or write associated with a shared buffer.

If the instruction is a read or write associated with a shared buffer, then rules may be retrieved (433) to determine (436) whether the instruction is to be replaced. If the instruction is to be replaced, then it may replaced (439) with a series of instructions according to the retrieved rules. For example, if the monitor 304 determines (427) that the instruction is a read or write associated with a shared buffer, the monitor 304 may forward the instruction to the patch generator 313, which may retrieve (433) rules 316 to determine (436) whether to replace the instruction. In some implementations, the instruction may not be replaced—for example, if the application corresponding to the instruction processes data in the same format as the data stored in the buffer. In some implementations, the instruction is replaced—for example, if the application corresponding to the instruction processes data in a different format than the format of the data that is stored in the buffer. To replace the instruction according to the retrieved rules, the patch generator 313 may employ the dynamic filter 319. In some implementations, additional instructions that are proximate to an instruction that reads from or writes to the shared buffer may also require special processing. For example, proximate instructions may be no-operation instructions (NOPs) that should be removed after the read or write instruction is replaced. Other special cases may exist that require instructions proximate to the one being replaced to be analyzed and also processed.

Optionally, the method 420 may generate (442) replacement instructions for other instructions in an instruction pool. For example, in addition to replacing the current instruction with a dynamic filter 319, the patch generator 313 may also replace instructions in the instruction pool 301. In some implementations, instructions in the instruction pool 301 may be replaced in parallel with execution of other instructions.

Figure 4C:
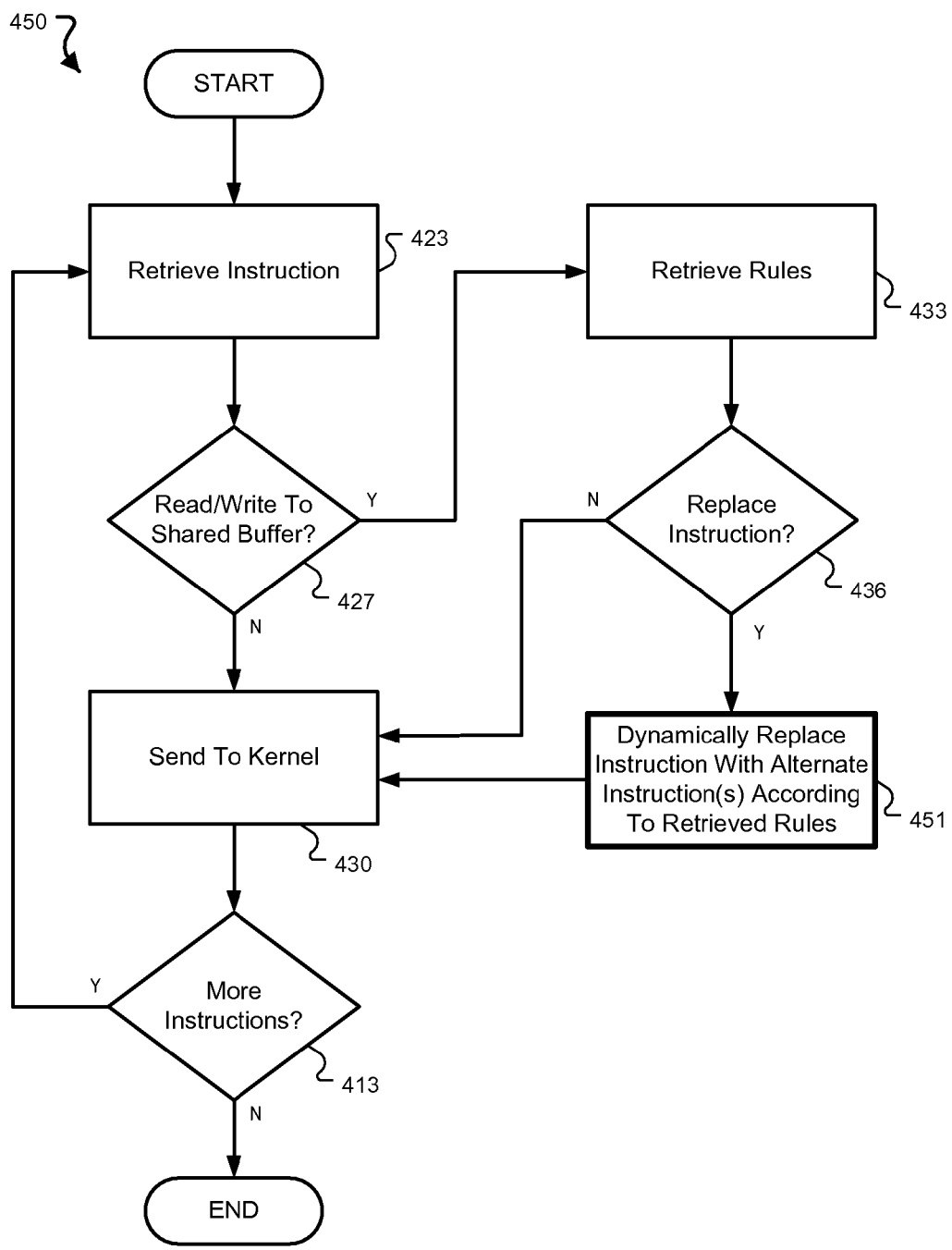

FIG. 4C illustrates another example method 450 that implements the general method 400 depicted in FIG. 4A. The method 450 is very similar to the method 420, except for the differences that are now described.

The method 450 dynamically replaces (451) instructions with alternate instructions, according to retrieved rules. For example, the patch generator 313 may generate a series of instructions with which to replace a specific instruction, then configure the dynamic filter 319 to replace any subsequent instances of the specific instruction with the generated series of instructions. In this manner, the patch generator 313 may generate a "patch" (e.g., a configurable, reusable filter) that can be subsequently applied without again retrieving rules and generating the instructions. As described above, the alternate instructions may also be generated to affect instructions that are proximate to the specific instruction.

Figure 4D:
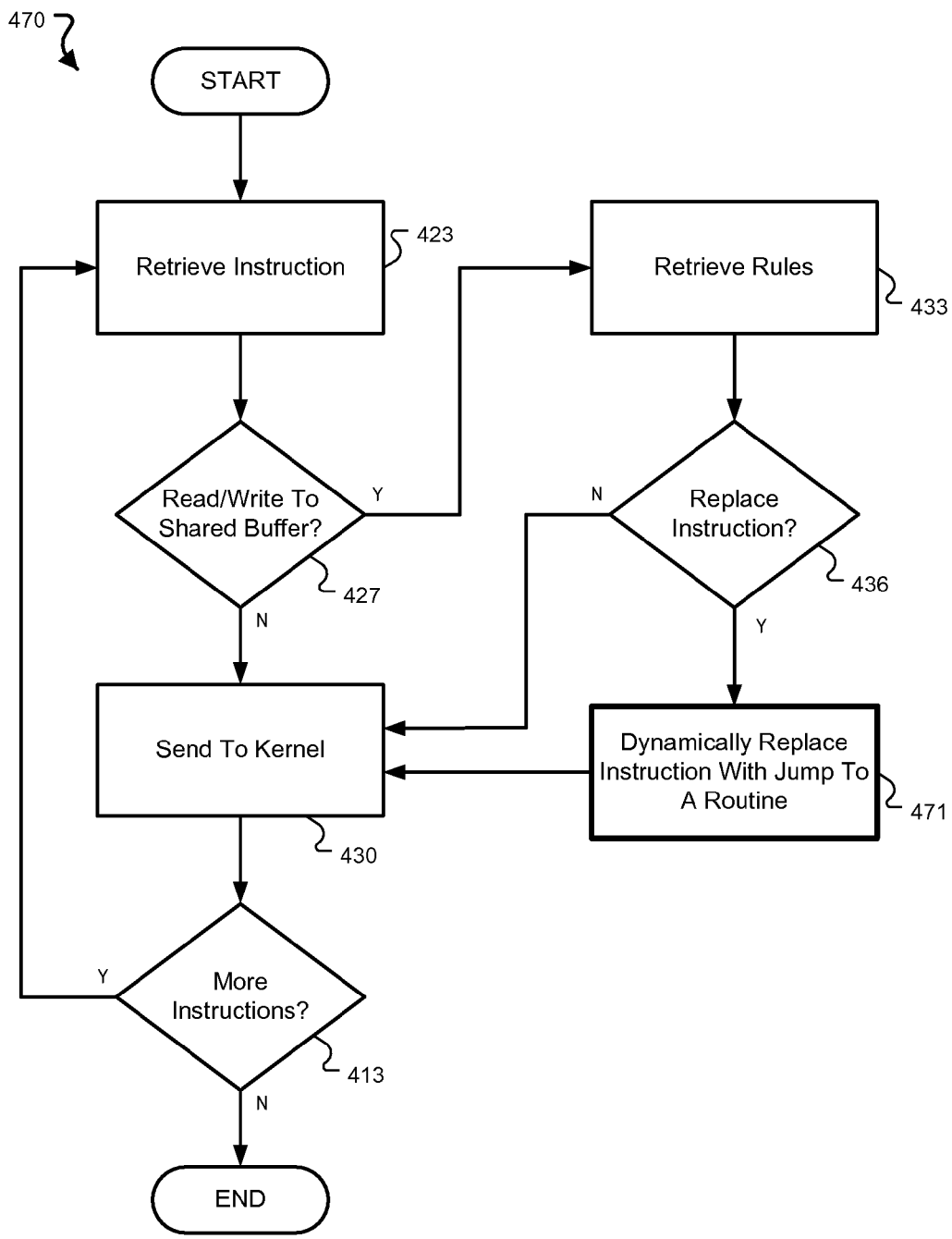

FIG. 4D illustrates another example method 470 that implements the general method 400 depicted in FIG. 4A. The method 470 is very similar to methods 420 and 450, except for the differences that are now described.

The method 470 dynamically replaces (471) specific instructions with a jump to a routine. The routine itself may contain a series of instructions that are executed in place of the specific instruction to transform data. For example, the patch generator 313 may generate a series of instructions with which to replace a specific instruction that accesses a shared buffer. The series of instructions may be generated as a routine to be executed by the exception handler 322 or otherwise, and instances of the specific instruction may be replaced in any manner (e.g., in one of the ways described above) with a jump to or a call of the routine.

Figure 5A:
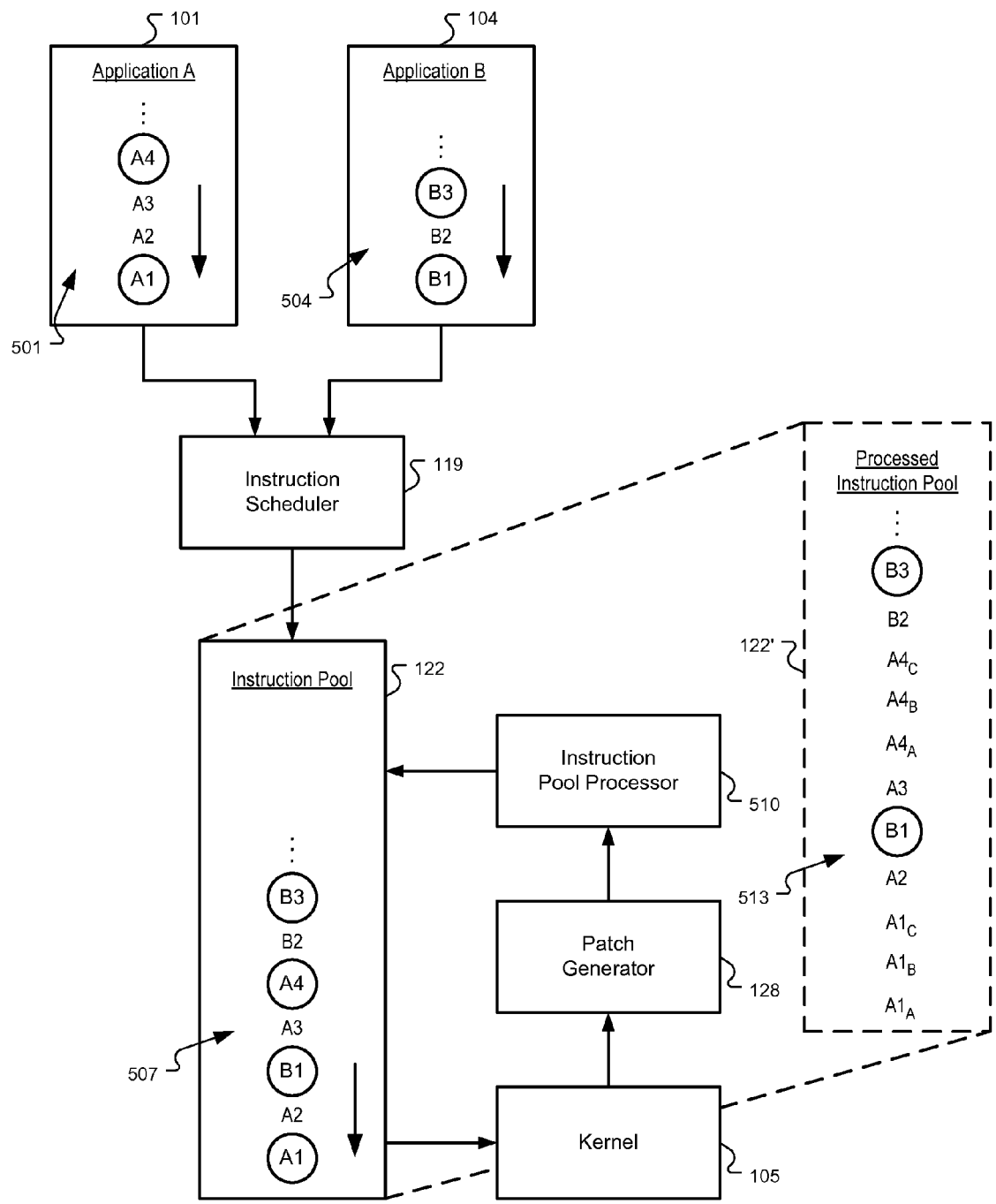
FIGS. 5A, 5B and 5C provide examples of how an instruction stream may be processed in order to effect transformation of data from a first format to a second format.
Figure 5B:
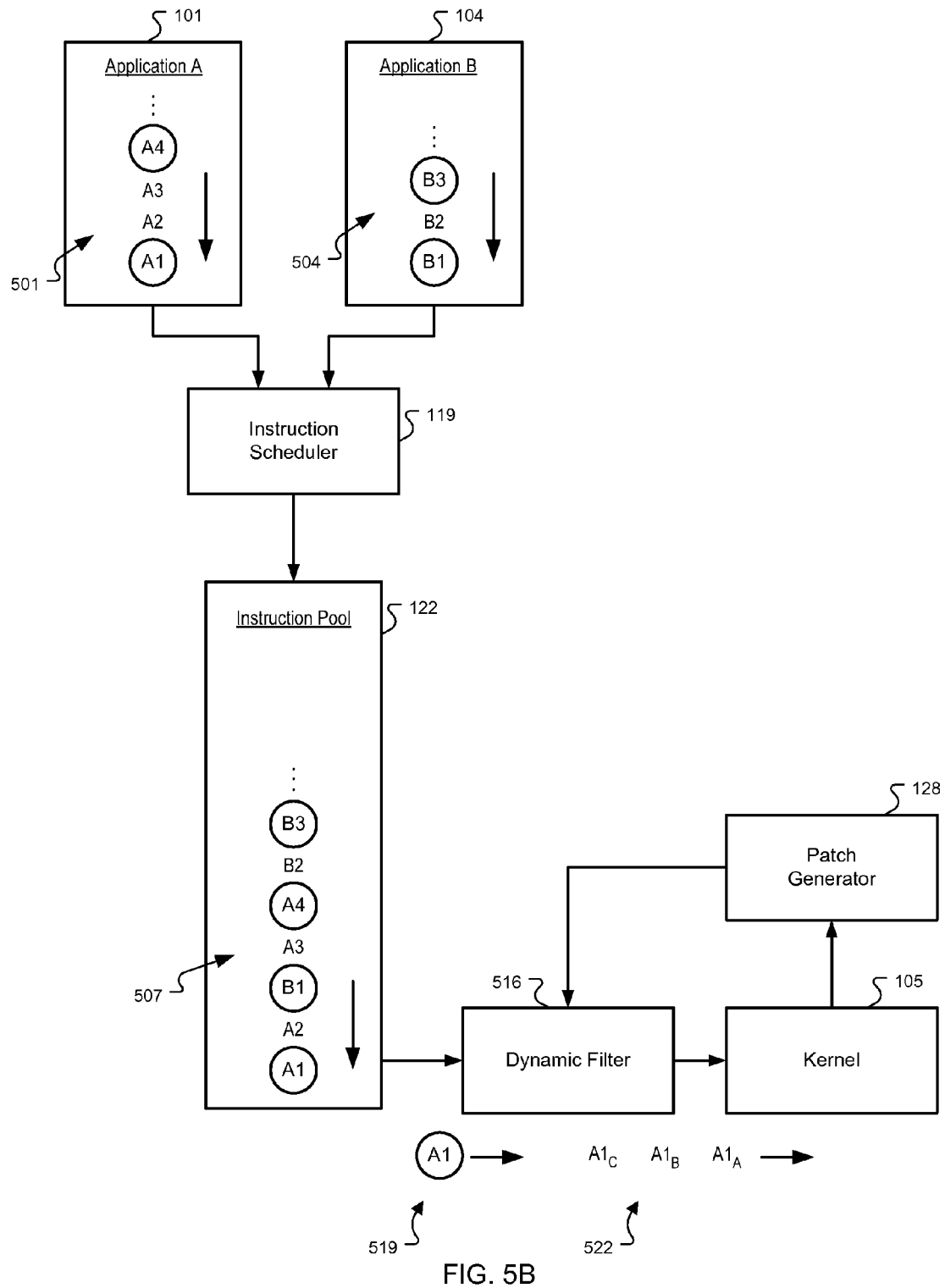
Figure 5C:
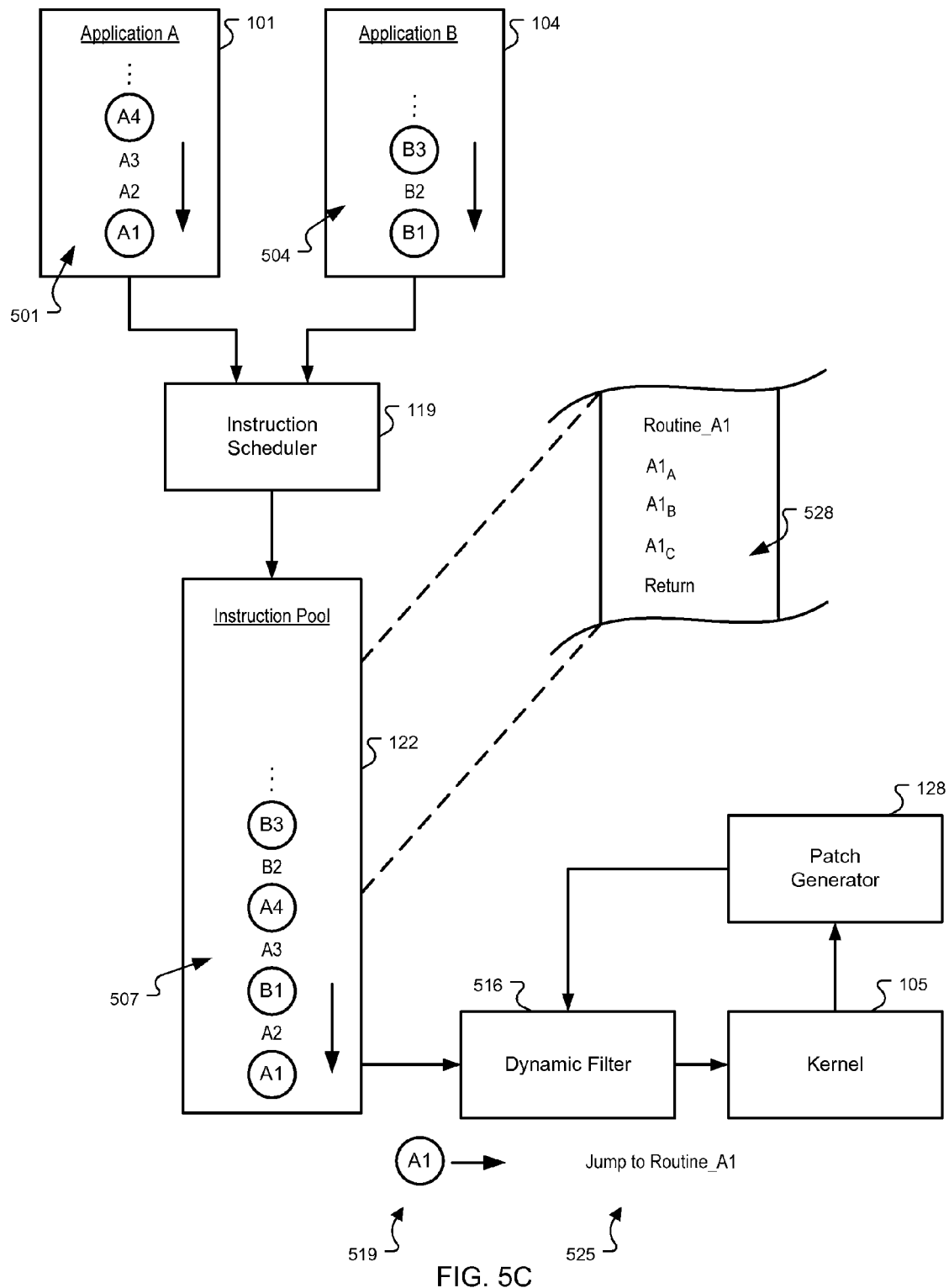

FIGS. 5A, 5B and 5C provide examples of how an instruction stream may be processed in order to effect transformation of data from a first format to a second format. FIG. 5A illustrates various instructions relative to some of the components of the computing device 100 that are shown in FIG. 1. As shown, the application 101 includes various instructions 501, including instructions "A1," "A2," "A3" and "A4." Instructions "A1" and "A4" are circled to indicate that these instructions access a shared buffer, such as the shared buffer 113. Similarly, the application 104 includes various instructions 504, including instructions "B1," "B2," and "B3." As shown, "B1" and "B3" are circled indicating that they also access the shared buffer.

The instruction scheduler 119 may prefetch and reorder various instructions associated with the applications 101 and 104, and the instruction pool 122 may store the prefetched and reordered instructions 507 for subsequent processing by the kernel 105. As described above, the patch generator 128 may process instructions that access the shared buffer (e.g., the circled instructions). For example, as described with reference to FIG. 4B, the patch generator 128 may access rules to determine whether and how to replace one or more instructions in the instruction pool 122.

To replace instructions in the instruction pool 122, the patch generator 128 may employ an instruction pool processor 510. In some implementations, the instruction pool processor 510 may have low-level access to the instruction pool 122. For example, the instruction pool processor 510 may be implemented in microcode and may have access to an instruction cache that implements the instruction pool 122. As shown in FIG. 5A, the instruction pool 122' may include a modified set of instructions 513 as a result of processing by the instruction pool processor 510. More particularly, instructions that access the shared buffer (e.g., "A1" and "A4") may be replaced with other instructions (e.g., "A1$_A$," "A1$_B$," and "A1$_C$"; and "A4$_A$," "A4$_B$," and "A4$_C$," respectively). The replacement instructions may access and transform data as appropriate. For example, referring to FIG. 2C, the instruction "A1" may be a read instruction from Application A (which processes data, for example, in an 8-bit graphical format) of data 247 in the shared buffer (which stores data, for example, in a 32-bit graphical format). The replacement instructions "A1$_A$," "A1$_B$" and "A1$_C$" may read the data and perform necessary transformations (e.g., they may transform 32-bit graphical data to an 8-bit graphical format). In some implementations, the replacement instructions may access the shared buffer from an alternate location. For example, referring to FIG. 1, the original instruction "A1" may access the protected shared buffer 113, but the replacement instructions "A1$_A$," "A1$_B$" and "A1$_C$" may access an alternate, unprotected mapping 131 of the shared buffer 113. In this manner the alternate instructions may prevent an exception, which is designed to protect the shared buffer 113, from being generated.

As shown in FIG. 5A, the instruction pool processor 510 may replace instruction based on rules, which may dictate that some instructions (e.g., "A1" and "A4") are replaced while other instructions are not replaced. For example, as shown in FIG. 5A, the instructions "B1" and "B3" may access the shared buffer but correspond to an application that processes data in the same format as the format of data in the shared buffer.

FIG. 5B illustrates instructions as they are processed by another method to transform data associated with a shared buffer. In particular, FIG. 5B illustrates instructions as they are processed by the method 450, which dynamically replaces instructions in an instruction stream. As shown, the patch generator 128 configures a dynamic filter 516 that, in some implementations, replaces instructions on their way to the kernel 105 for processing. For example, instruction "A1" 519 may be replaced by the dynamic filter 516 with the instructions 522 "$A1_A$," "$A1_B$" and "$A1_C$."

In some implementations, the patch generator 128 may configure the dynamic filter 516 the first time the patch generator 128 processes a particular instruction. That is, the patch generator 128 may configure the dynamic filter 516 to replace subsequent instances of the particular instruction without further involvement by the patch generator 128. In some implementations, the patch generator 128 may interact with the dynamic filter 516 each time the dynamic filter 516 replaces an instruction.

FIG. 5C illustrates instructions as they are processed by another method to transform data associated with a shared buffer. In particular, FIG. 5C illustrates instructions as they are processed by the method 470, which dynamically replaces instructions in an instruction stream with jumps to or calls of a routine that includes the replacement instructions.

As shown, the dynamic filter 516 may replace the instruction "A1" 519 with a jump instruction 525 to a routine 528, in a similar manner that the dynamic filter 516 replaces an instruction 519 with other instructions 522, as shown in FIG. 5B. The routine 528 may include the replacement instructions.

Figure 6:
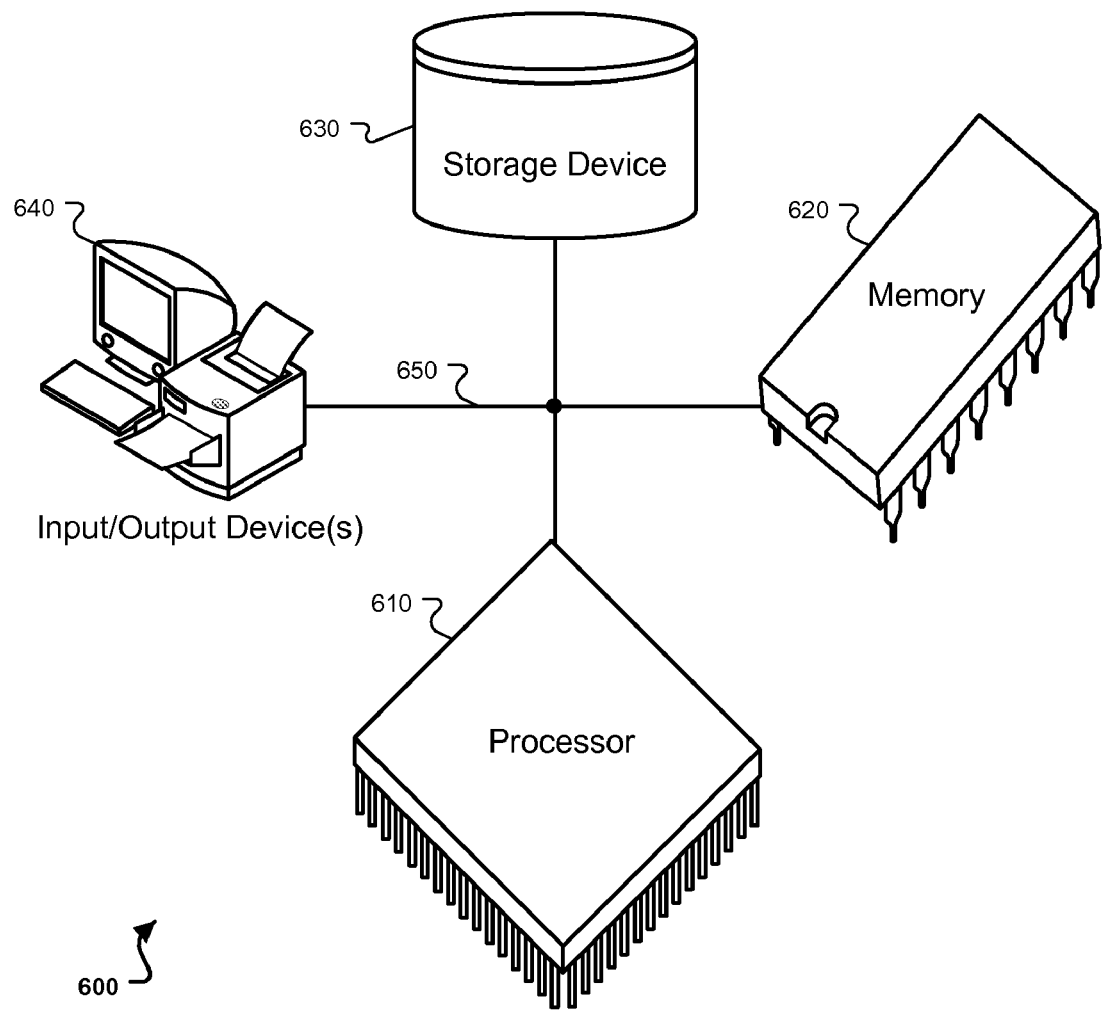
FIG. 6 is a block diagram of a computer device that may be used in the operations described herein.

FIG. 6 is a block diagram of a computer device 600 that may be used in the operations described herein. The computer device 600 includes a processor 610, a memory 620, a storage device 630 and an input/output device 640. Each of the components 610, 620, 630 and 640 are interconnected using a system bus 650.

The processor 610 is capable of processing instructions for execution within the computer device 600. In some implementations, the processor 610 is a single-threaded processor. In other implementations, the processor 610 is a multi-threaded processor. The processor 610 is capable of processing instructions stored in the memory 620 or on the storage device 630 to display graphical information for a user interface on the input/output device 640.

The memory 620 stores information within the computer device 600. In some implementations, the memory 620 is a computer-readable medium. In some implementations, the memory 620 is a volatile memory unit. In some implementations, the memory 520 is a non-volatile memory unit.

The storage device 630 is capable of providing mass storage for the computer device 600. In some implementations, the storage device 630 is a computer-readable medium. In various other implementations, the storage device 630 may be a floppy disk device, a hard disk device, an optical disk device, or a tape device.

The input/output device 640 provides input/output operations for the computer device 600. In some implementations, the input/output device 640 includes a keyboard and/or pointing device. In some implementations, the input/output device 640 includes a display unit for displaying graphical user interfaces.

The methods described herein may be implemented in digital electronic circuitry, or in computer hardware, firmware, software, or in combinations of them. Apparatus may be implemented in a computer program product tangibly embodied in an information carrier, e.g., in a machine-readable storage device or in a propagated signal, for execution by a programmable processor; and actions of the method may be performed by a programmable processor executing a program of instructions to perform functions of the invention by operating on input data and generating output. Implementations may include one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, a computer device may include a display device such as a CRT (cathode ray tube) or LCD (liquid crystal display) monitor for displaying information to the user and a keyboard and a pointing device such as a mouse or a trackball by which the user may provide input to the computer.

Apparatus and methods disclosed herein may be implemented in a computer system that includes a back-end component, such as a data server; or that includes a middleware component, such as an application server or an Internet server; or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server may arise by virtue of computer programs running on the respective computers and having a client-server relationship to each other.

A number of implementations have been described. Nevertheless, it will be understood that various modifications may be made without departing from the spirit and scope of this disclosure. For example, various implementations have been described with reference to two applications. However, the systems, apparatus, methods and computer program implementations described herein may also apply to a single application; to more than two applications; or to one or more processes, threads, routines or subroutines. Accordingly, other implementations are within the scope of the following claims.

What is claimed is:

1. A computer program product tangibly embodied in a storage device and having instructions that, when executed, cause a processor to perform operations comprising:
managing execution of application functions, including execution of a first application function and a second application function that both access data in a shared buffer, wherein the first application function processes data in a first format, and the second application processes data in a second format that is different than the first format;
determining if a first instruction that is stored at a first memory location causes, upon execution, data to be read from or written to the shared buffer; and
when it is determined that the first instruction causes, upon execution, data to be read from or written to the shared buffer, 1) identifying one or more replacement instructions to execute in place of the first instruction; 2) storing the one or more replacement instructions; and 3) replacing the first instruction at the first memory location, with a second instruction that, when executed, causes the stored one or more replacement instructions to be executed.

2. The computer program product of claim 1, wherein the shared buffer is a frame buffer for processing graphical data to be displayed on a display screen.

3. The computer program product of claim 1, wherein determining that the first instruction causes, upon execution, data to be read from or written to the shared buffer comprises receiving an exception generated by a memory management unit associated with the processor.

4. The computer program product of claim 1, wherein execution of the one or more replacement instructions causes data in the first format to be converted to the second format.

5. The computer program product of claim 1, wherein identifying the one or more replacement instructions comprises retrieving a rule that specifies how data is to be converted from the first format to the second format.

6. The computer program product of claim 1, wherein the first instruction, upon execution, causes an attempted access of a region of memory that is protected by a memory management unit associated with the processor, and the one or more replacement instructions, upon execution, cause a region of memory that is not protected by the memory management unit to be accessed.

7. The computer program product of claim 6, wherein the operations further comprise generating an exception when execution of the first instruction causes an attempted access of the region of memory that is protected by the memory management unit.

8. The computer program product of claim 7, wherein the operations further comprise executing the one or more replacements instructions without causing an exception to be generated.

9. The computer program product of claim 1, wherein the operations further comprise removing one or more instructions that are stored proximate to the first memory location, such that after removing the one or more instructions, the one or more removed instructions are not executed immediately before or immediately after execution of the one or more replacement instructions.

10. The computer program product of claim 9, wherein the one or more removed instructions include at least one no-operation instruction.

11. A computer-implemented method of processing instructions to be executed by a processor, the method comprising:
fetching a first instruction stored at a first memory location;
determining that execution of the first instruction causes a read from or write to a shared buffer that comprises a region of memory that is accessed by both a first application and a second application that is different than the first application; and
identifying one or more replacement instructions to execute in place of the first instruction; storing the one or more replacement instructions; and replacing the first instruction at the first memory location with a second instruction that, when executed, causes the stored one or more replacement instructions to be executed.

12. The computer-implemented method of claim 11, wherein the one or more replacement instructions comprise the second instruction.

13. The computer-implemented method of claim 11, further comprising executing the one or more replacement instructions.

14. The computer-implemented method of claim 13, further comprising fetching the second instruction from the first memory location and fetching and executing the one or more replacement instructions.

15. The computer-implemented method of claim 11, wherein the first application processes data in a first format, and the second application processes data in a second format that is different than the first format.

16. The computer-implemented method of claim 11, further comprising protecting the shared buffer, including configuring a memory management unit to generate an exception when an instruction that accesses the shared buffer is executed.

17. The computer-implemented method of claim 16, wherein determining that the first instruction reads from or writes to a shared buffer comprises receiving an exception from the memory management unit.

18. A method of processing an instruction stream comprising instructions associated with two or more processes, the method comprising:
receiving an instruction associated with a first process;
determining if the instruction, when executed, causes data to be read from or written to a buffer that is shared by the first process and a second process;
forwarding the instruction to an execution unit if the instruction does not cause data to be read from or written to a buffer that is shared by the first process and the second process; and
when the instruction causes data to be read from or written to a buffer that is shared by the first process and the second process: (a) retrieving a rule associated with the instruction; (b) determining, based on the retrieved rule, if the instruction is to be replaced; and (c) if the instruction is not to be replaced, forwarding the instruction to the execution unit, and if the instruction is to be replaced, replacing the instruction with one or more replacement instructions, based on the retrieved rule.

19. The method of claim 18, wherein receiving the instruction comprises receiving the instruction from an instruction queue.

20. The method of claim 19, further comprising replacing other instructions in the instruction queue with replacement instructions.

21. A computer program product tangibly embodied in a storage device and having instructions that, when executed, cause a processor to perform operations comprising:

determining if a first instruction that is stored at a first memory location causes, upon execution, data to be read from or written to a shared buffer that is accessed by both a first application function that processes data in a first format and a second application that processes data in a second format that is different than the first format and when it is determined that the first instruction causes, upon execution, data to be read from or written to the shared buffer, 1) identifying one or more replacement instructions to execute in place of the first instruction; 2) storing the one or more replacement instructions; and 3) replacing the first instruction at the first memory location, with a second instruction that, when executed, causes the stored one or more replacement instructions to be executed.

* * * * *